United States Patent
Derscheid

(10) Patent No.: US 8,206,205 B2
(45) Date of Patent: Jun. 26, 2012

(54) METHOD OF UNPLUGGING CONTROL FOR A FEEDING SYSTEM

(75) Inventor: Daniel E. Derscheid, Hedrick, IA (US)

(73) Assignee: Deere & Company, Moline, IL (US)

( * ) Notice: Subject to any disclaimer, the term of this patent is extended or adjusted under 35 U.S.C. 154(b) by 145 days.

(21) Appl. No.: 12/464,412

(22) Filed: May 12, 2009

(65) Prior Publication Data

US 2010/0287902 A1 Nov. 18, 2010

(51) Int. Cl.
*A01D 75/18* (2006.01)
*A01F 12/16* (2006.01)
*A01F 21/00* (2006.01)

(52) U.S. Cl. ............................................. 460/2; 701/50

(58) Field of Classification Search ............... 56/16.4 R, 56/341, 10.2 J, DIG. 15; 460/6, 7, 116, 2; 701/50

See application file for complete search history.

(56) References Cited

U.S. PATENT DOCUMENTS

| | | | | |
|---|---|---|---|---|
| 3,721,301 A * | 3/1973 | Weasel et al. | | 171/61 |
| 3,973,379 A * | 8/1976 | Ecker et al. | | 56/11.9 |
| 4,261,161 A * | 4/1981 | Colgrove et al. | | 460/3 |
| 4,430,847 A * | 2/1984 | Tourdot et al. | | 56/10.7 |
| 4,433,619 A * | 2/1984 | Anstey et al. | | 100/40 |
| 4,444,098 A * | 4/1984 | Soteropulos | | 100/88 |
| 4,466,231 A * | 8/1984 | Rowland-Hill et al. | | 460/2 |
| 4,516,389 A * | 5/1985 | Core | | 56/341 |
| 4,604,858 A * | 8/1986 | Esau et al. | | 56/341 |
| 4,782,652 A * | 11/1988 | White | | 56/341 |
| 4,793,561 A * | 12/1988 | Burda | | 241/36 |
| 5,527,218 A * | 6/1996 | Van den Bossche et al. | ... | 460/20 |
| 5,873,227 A * | 2/1999 | Arner | | 56/14.6 |
| 6,247,296 B1 * | 6/2001 | Becker et al. | | 56/11.2 |
| 6,301,869 B1 * | 10/2001 | Schmitcke | | 56/341 |
| 6,381,932 B1 * | 5/2002 | Clauss | | 56/10.2 J |
| 6,644,006 B1 * | 11/2003 | Merritt et al. | | 56/341 |
| 6,681,552 B2 * | 1/2004 | Nelson et al. | | 56/11.2 |
| 6,843,044 B2 * | 1/2005 | Clauss | | 56/10.3 |
| 7,252,587 B2 * | 8/2007 | Viaud | | 460/109 |
| 7,452,267 B2 * | 11/2008 | Bundy et al. | | 460/6 |
| 7,520,113 B2 * | 4/2009 | Johnson et al. | | 56/11.2 |
| 7,520,452 B2 * | 4/2009 | Watano et al. | | 241/36 |
| 2004/0093841 A1 * | 5/2004 | Clauss | | 56/16.4 R |
| 2005/0198936 A1 * | 9/2005 | Viaud | | 56/341 |
| 2007/0026910 A1 * | 2/2007 | Brome et al. | | 460/6 |
| 2008/0028738 A1 * | 2/2008 | Viaud | | 56/341 |
| 2008/0234016 A1 * | 9/2008 | Bundy et al. | | 460/2 |
| 2008/0234017 A1 * | 9/2008 | Bundy et al. | | 460/6 |
| 2008/0295471 A1 * | 12/2008 | Pollklas et al. | | 56/10.2 J |
| 2009/0222240 A1 * | 9/2009 | McClain et al. | | 702/182 |
| 2009/0272597 A1 * | 11/2009 | Deppe et al. | | 180/315 |
| 2010/0048269 A1 * | 2/2010 | Ricketts et al. | | 460/2 |

* cited by examiner

Primary Examiner — Arpad Fabian-Kovacs

(57) ABSTRACT

A method of unplugging hay and forage equipment, including the steps of identifying a plug, substantially simultaneously activating unplugging devices, unplugging the equipment, and returning the unplugging devices to position of normal operation. The identifying step includes identifying a plug in the equipment caused by the material entering the equipment. The activating step includes activating substantially simultaneously a plurality of unplugging devices. The returning step includes returning the plurality of unplugging devices to their normal operating positions.

7 Claims, 5 Drawing Sheets

METHOD OF UNPLUGGING CONTROL FOR A FEEDING SYSTEM

FIELD OF THE INVENTION

The present invention relates to an unplugging apparatus and method for the unplugging of a feeding system; and, more particularly, to an unplugging apparatus and method for a feeding system of hay and foraging systems.

BACKGROUND OF THE INVENTION

Hay and foraging equipment are utilized in the processing of plant material and include mowers, conditioners, flail choppers, windrowers, and balers for both dry and silage uses. The hay system, such as a round baler, includes a pickup mechanism, which picks the crop material from the ground and supplies it to a bale forming chamber. The bale forming chamber receives the crop material and includes a series of side-by-side moving belts, which rotate the crop material into a round or more accurately a cylindrical bale. Typically, the bale forming chamber has a crop inlet and has a width that corresponds to the width of the bale being formed within the bale forming chamber. The crop material is typically initially formed into windrows on the ground after it is cut and processed through a conditioner. The crop material in the windrow may have varying densities and may even include foreign material. The pickup header of the baler picks the crop material off of the ground and directs it to the bale forming chamber.

As the baler is driven across the field encountering crop material, the crop material may be bunched or otherwise non-uniformly distributed causing surges in the amount of power required from the power source to process the material encountered. If the material encountered is too thick or even includes some foreign material such as a piece of wood or a stone, a plug can be formed that causes the baling mechanism to be overloaded. Typically, this requires operator intervention requiring the operator to stop the tractor and try to unplug it by perhaps reversing the travel of the tractor to try to pull some of the material out. The encountering of a plug often requires the operator to stop the drive mechanism and then release various aspects of the baler mechanism associated with the flow of the material so that the plug can be removed either manually or by operating portions of the baler with mechanisms in their non-normal operating positions to try to clear the plug from the baler. Once the plug is removed, the operator then goes and repositions the mechanisms that were disengaged, moving them back into a normal operating position. This prior art techniques disadvantageously require operator intervention and the operator can even potentially damage the machine by operating it with only some of the mechanisms being moved to a released position.

Various unplugging devices are included in the feeding systems on hay and forage equipment which include drop floors, knife disengagement, reversers, rotor movement, pickup baffle positioners, power feed clutches, and the like. These devices are activated electrically, hydraulically, PTO driven, or a combination thereof. These devices are activated individually to make the necessary steps to relieve tight plugs and to then sequentially feed crops through the feeding device. Actuating these devices individually is cumbersome, time-consuming and difficult to understand for inexperienced operators. For example, if knives are not lowered during reversing or dropping the floor operations can cause damage if they are out of position.

What is needed in the art is a system that manages the unplugging of hay or forage equipment in a cost effective and efficient manner.

SUMMARY OF THE INVENTION

The present invention provides an unplugging method and apparatus for use with hay and foraging equipment, and, more particularly, provides an apparatus for the unplugging of balers, hay conditioners, windrowers, mowers, flail chopping, and forage harvesting equipment.

The invention in one form is directed to a method of unplugging hay and forage equipment, including the steps of identifying a plug, activating unplugging devices, unplugging the equipment, and returning the unplugging devices to position of normal operation. The identifying step includes identifying a plug in the equipment caused by the material entering the equipment. The activating step includes activating substantially simultaneously a plurality of unplugging devices. The returning step includes returning the plurality of unplugging devices to their normal operating positions.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
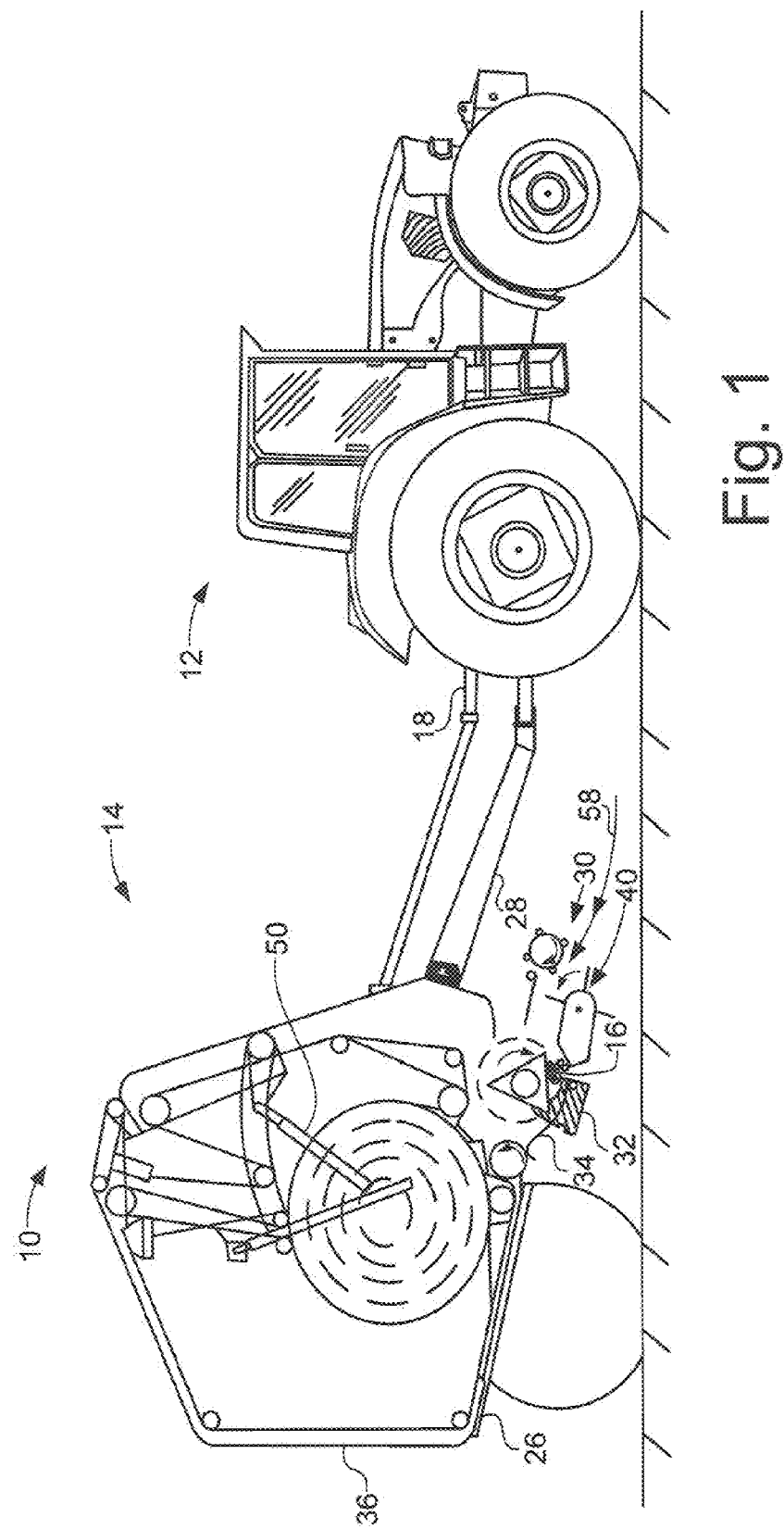
FIG. 1 is a partial schematic illustration of a baler incorporating an embodiment of the unplugging apparatus and utilizing the unplugging method of the present invention and being towed by a tractor.
Figure 2:
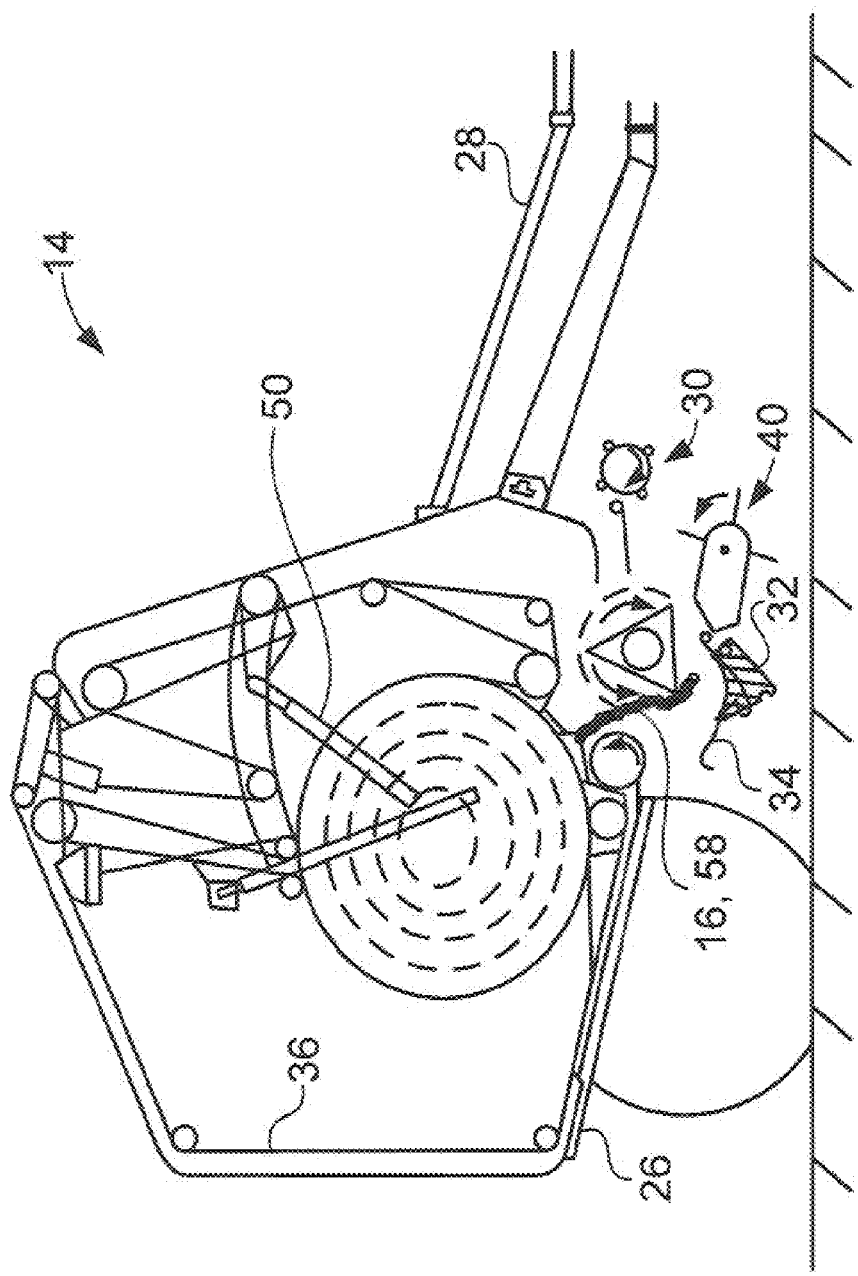
FIG. 2 is a schematic illustration of a profile of the baler of FIG. 1.
Figure 3:
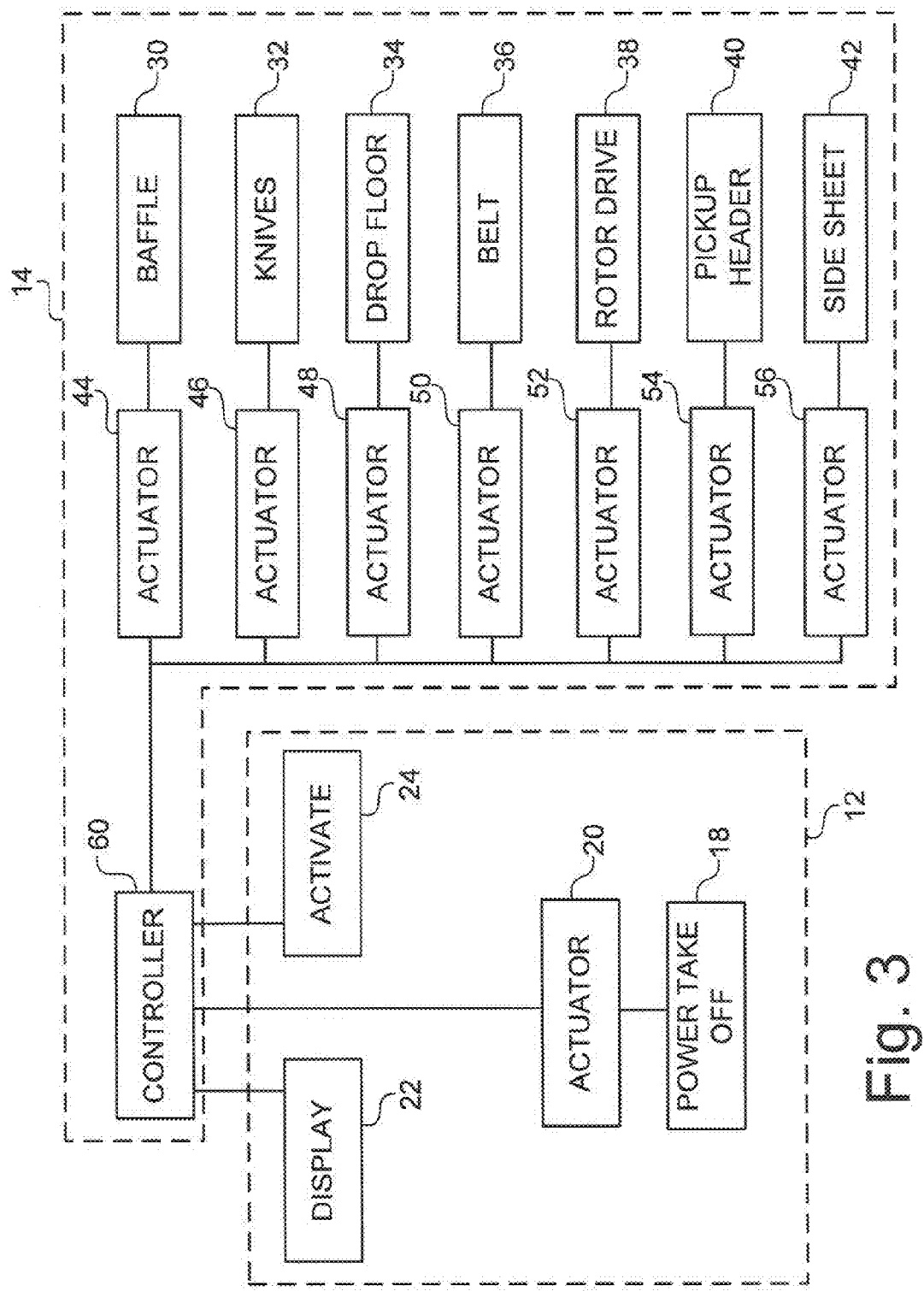
FIG. 3 is a schematic illustration of elements used in the embodiment of the present invention.

Referring now to the drawings and, more particularly, to FIGS. 1-3, there is illustrated a hay or foraging system 10 that includes a tractor 12 towing a baler 14. While baler 14 is being illustrated herein, it is understood that baler 14 is a hay or foraging device 14 that could include square or round balers for either dry or silage material, forage harvesters, mowers, flail chopping devices, hay conditioners, and windrowers, each of which encounter and process bulk crop material and have a crop inlet which can be plugged. A plug 16 is illustrated where the flow of material has clumped or some foreign matter is substantially blocking the operation of the feeding mechanisms of baler 14. The handling of plug 16 is a focus of the present invention.

Tractor 12 has a PTO 18 that provides power to at least some of the mechanisms of baler 14. Tractor 12 additionally includes an actuator 20, a display 22, and an activation button 24. PTO 18 may be disengaged by action of actuator 20 that may be incorporated into elements of tractor 12, and which may be under the control of a controller associated with tractor 12. The controller associated with tractor 12 may receive a signal from baler 14 causing actuator 20 to disengage and even brake power takeoff unit 18. A display 22 alerts the operator that a plug 16 has been encountered or display 22 may additionally indicate that a plug 16 has been cleared. Additionally, display 22 can display the operating positions of various aspects of baler 14. Activation button 24 allows the operator to initiate an unplugging sequence to remove plug 16 from baler 14. The phrase "removing plug 16 from baler 14" also incorporates the processing of plug 16 so that the crop material is processed within baler 14 or removed from baler 14 or a combination thereof. Activation button 24 may also include a function commanding baler 14 to reposition mechanisms therein into a normal operating position.

Baler 14 includes a frame or chassis 26, a tongue 28, a baffle 30, knives 32, a drop floor 34, belts 36, a rotor drive 38, and a pickup header 40. Side sheet 42 is schematically shown in FIG. 3 and would exist on another embodiment of a baler to control the pressure encountered by a plunger of a square baler as it presses hay into a square bale. Actuators 44-56 are respectively associated with these operational elements of baler 14, as illustrated in FIG. 3. Crop material enters baler 14 along material flow path 58 and is picked up by pickup header 40 and travels between baffle 30 and progresses on to knives 32 and drop floor 34 on its way to a bale forming chamber.

A controller 60 interacts with actuators when a plug is detected to substantially simultaneously actuate several of the elements of baler 14 including some combination at least of baffle 30, knives 32, drop floor 34, belts 36 (or side sheet 42), rotor drive 38, pickup header 40 and power takeoff 18. Advantageously, the simultaneous moving of these elements and the removal of power supplied by way of power takeoff 18 all work to clear plug 16 from interfering with the operation of tractor 12 and baler 14. Controller 60 may be an electronic control system that interacts with selective control valves (SCV) or it may be some other combination of control that interacts with actuators 20 and 44-56.

Figure 4:
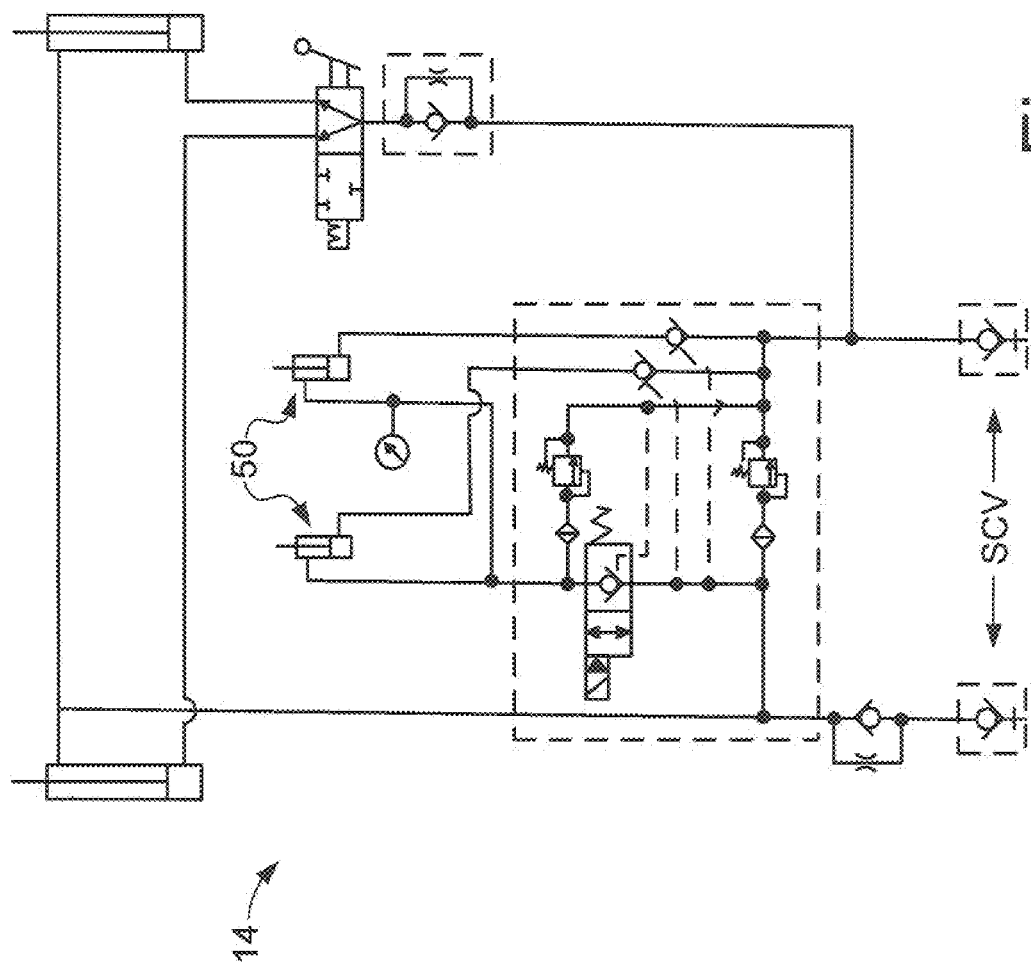
FIG. 4 is schematic illustration of an embodiment of control system of the present invention.
Figure 5:
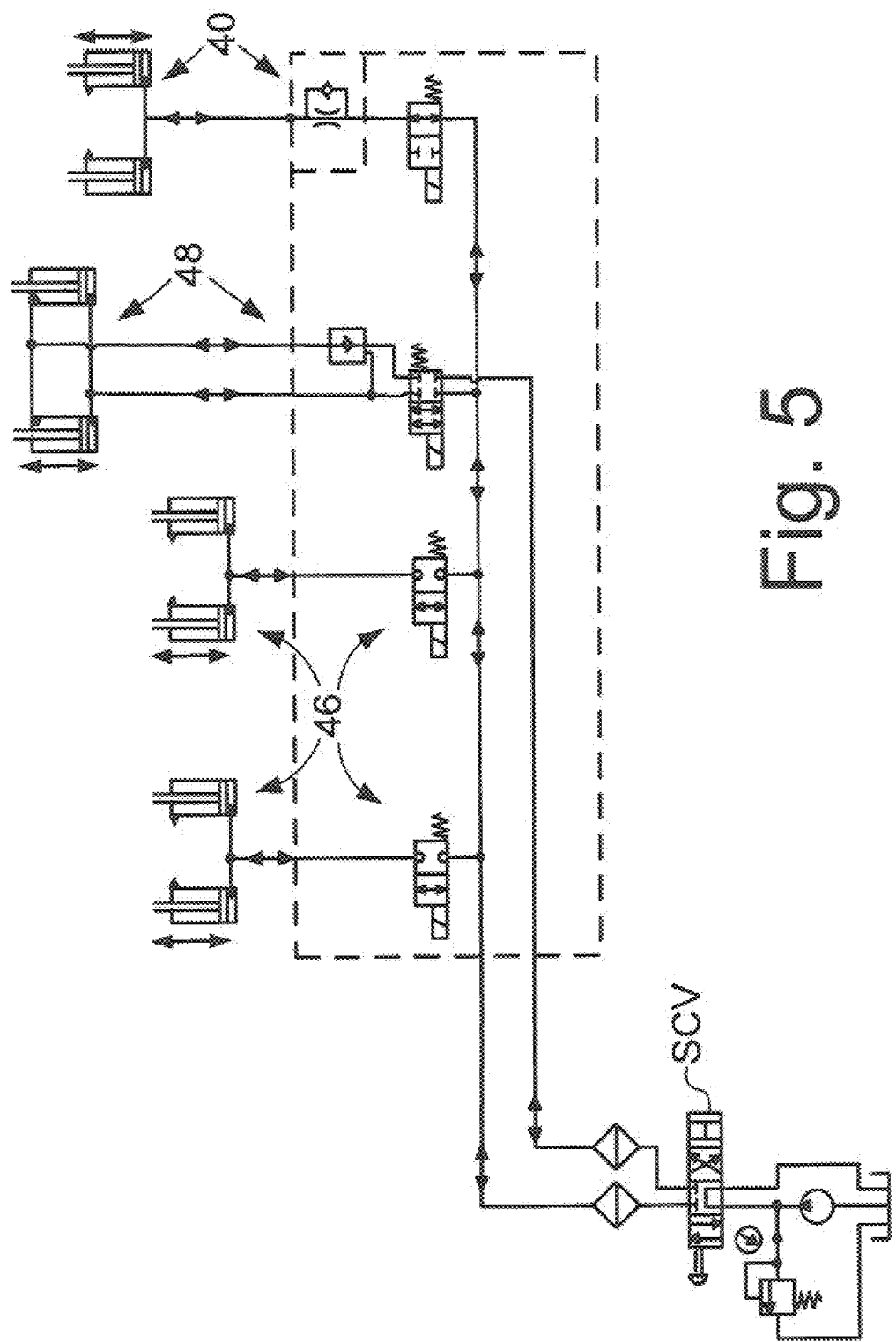
FIG. 5 is another schematic illustration of control system for the baler of FIGS. 1 and 2.

Now, additionally referring to FIGS. 4 and 5, there is illustrated some hydraulic schematics to operate functions of baler 14 including the bale tension cylinders and gate release cylinders shown in FIG. 4 as well as a hydraulic circuit to engage knives 32, drop floor 34, and pickup 40 when substantially simultaneously activated. It should be understood that this substantially simultaneous operation causes a quick response to the presence of plug 16. The nearly simultaneous or simultaneous movement of these elements can include the activation of a sequential movement of some portions in the event that one element is better moved before another and that such a sequential operation is initiated by the substantially simultaneous movement initiated by controller 60. Controller 60 is interfaced with the SCV valves of FIGS. 4 and 5 and the hydraulic cylinders illustrated in FIGS. 4 and 5 correspond to corresponding actuators of FIG. 3.

During normal operation, tractor 12 pulls baler 14, which encounters the crop material that enters along material flow path 58 making its way to the bale forming chamber. When plug 16 is encountered, controller 60 substantially simultaneously activates a plurality of actuators 44, 46, 48, 50, 52, and 52. This action causes the following elements to respond: baffle 30 is moved away from material flow 58; knives 32 drop away from material flow 58; drop floor 34 moves away from material flow path 58; tension on belt 36 is reduced; rotor drive 38 may be stopped or reversed; and pickup header 40 may be moved with its intake mechanism slowed, stopped, or reversed, thereby affecting the amount of flow along material flow path 58. Additionally, power takeoff 18 may be disengaged from powering baler 14 to thereby prevent the overloading of tractor 12. Power takeoff 18 may be re-engaged to move plug 16 while the previous elements are in their previously described position to reduce the influence of plug 16 on the normal operation of baler 14.

Once plug 16 has been removed or otherwise dissipated in the system, controller 60 then utilizes actuators 44, 46, 48, 50, 52, and 54 to respectively move baffle 30, knives 32, drop floor 34 back into their operating position and to increase the tension of operating level of belt 36 and to engage rotor drive 38 and pickup head 40 so that they are respectively placed in a normal operating mode for the reception of crop material. Actuator 20 is activated to engage power takeoff 18 so that mechanical power again is restored to baler 14 so that the operations of baler 14 can resume. The movement of these elements can be substantially simultaneous so that baler 14 can quickly resume normal operating functions.

Controller 60 activates any combination of the mechanisms that also serve as unplugging devices, previously mentioned, simultaneously and additionally include either instructions to back up baler 14 conveyed to the operator by way of display 22 or an automatic function in which baler 14 is automatically reversed. When unplugging is completed, the device is returned to normal operating positions. Another example includes a precutter type feeding system with an electro-hydraulic control. First, a plug occurs at the entrance of the material to baler 14 or along the path of material flow 58. The operator pushes activation device 24 causing controller 60 to disengage PTO 18 by utilizing actuator 20. Substantially simultaneously, a solenoid is energized to divert hydraulic pressure to the low pressure circuit of belt tensioner 50 in the form of actuator 50 and additionally energizes solenoids in parallel SCV circuits for moving pickup 40, knives 32, and drop floor 34. In this operation, the operator only actuates a single control such as activation device 24 or it may be in the form of a single SCV lever to thereby position all of the devices to relieve restrictions along material flow path 58. At this point, actuator 20 is activated causing power takeoff 18 to be engaged to feed the plug through or away from baler 14. The operator or controller 60 then activates an SCV to return all of the unplugging devices to their normal operating position and continue to bale. With the use of electrical or electronic sensors and actuators, electronic SCV hydraulics, and/or electronic PTO controls, several of these steps are done without operator activation.

The present invention includes certain advantages including there are fewer steps for the operator that are needed for the removal of plug 16. This allows a less skilled operator to be productive with baler 14. There is less wasted time in the moving the devices to an unplugging position and can also include positions that are additionally used to service the elements, such as for the replacement or sharpening of knives 32. Another advantage is that elements of baler 14 are not inadvertently positioned during a plug clearing operation, such as the positioning of knives 32 during the unplugging operation. The unplugging operation that results from the present invention includes a more positive unplugging of baler 14 by relieving crop restrictions in several areas of the feeding system simultaneously. This not only relieves areas of plugging but it also diverts available PTO drive power to areas where it is most needed. For example, tractor 12 may be limited to 150 PTO horsepower with 50 horsepower being used to form a round bale and 100 horsepower being used to feed through a crop slug. When a crop slug forms a plug and is stuck in the feeding mechanism, it may exceed the 100 horsepower that is available causing the baler or tractor clutch to disengage or to kill the tractor engine. If the tension of belt 36 is reduced, then only 20 horsepower is needed to rotate the bale, rather than 50, thereby allowing a total of 130 horsepower to be available to feed the slug through the feeder.

Specific to a round baler 14, bale forming belts are tensioned during bale growth with the belt tension being proportional to bale density but it is also proportional to the power consumption to form and rotate the bale in the bale forming chamber. As such, reducing belt tension reduces belt power consumption, thereby enhancing the ability of baler 14 to deal with plug 16.

Having described the preferred embodiment, it will become apparent that various modifications can be made without departing from the scope of the invention as defined in the accompanying claims.

The invention claimed is:

1. A method of unplugging one of hay and forage equipment, comprising the steps of:
    identifying a plug in the equipment caused by material entering the equipment;
    activating substantially simultaneously a plurality of unplugging devices unplugging the equipment including actuating mechanisms to change positions of mechanisms in the equipment, said activating step further including the step of reducing tension on at least one belt in the equipment, thereby lowering a density of a bale therein; and
    returning said plurality of unplugging devices to normal operating positions
    wherein a controller issues signals causing the execution of said activating step, said unplugging step and said returning step.

2. The method of claim 1, wherein said activating step includes issuing a signal to a power-take-off to disengage.

3. The method of claim 1, wherein said activating step further includes the steps of:
    raising a baffle of the equipment;
    lowering precutter knives of the equipment; and
    lowering a drop floor of the equipment.

4. The method of claim 1, wherein said activating step further includes the step of raising a pickup header of the equipment.

5. The method of claim 1, wherein said activating step further includes the step of reducing side sheet pressure in the equipment, thereby lowering a density of a bale therein.

6. The method of claim 1, wherein said activating step includes a lowering of a drop floor and precutter knives of the equipment.

7. The method of claim 1, wherein said activating step includes a lowering of a knives and reversing the movement of at least one of said mechanisms in the equipment.

* * * * *